United States Patent
Yoo et al.

(10) Patent No.: US 12,011,704 B2
(45) Date of Patent: Jun. 18, 2024

(54) CATALYST FOR AVIATION FUEL PRODUCTION FROM BIO-OIL, METHOD FOR PREPARATION OF THE SAME AND METHOD FOR BIO-OIL UPGRADING USING THE SAME

(71) Applicant: KOREA INSTITUTE OF SCIENCE AND TECHNOLOGY, Seoul (KR)

(72) Inventors: Chunjae Yoo, Seoul (KR); Jeong-Myeong Ha, Seoul (KR); Dong Jin Suh, Seoul (KR); Jae Wook Choi, Seoul (KR); Young Hyun Yoon, Seoul (KR); Kyeongsu Kim, Seoul (KR); Chang Soo Kim, Seoul (KR); Kwang Ho Kim, Seoul (KR); Thi Lien Do, Seoul (KR); Jong Hyun Lee, Seoul (KR); Jin A Eun, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 18/146,987

(22) Filed: Dec. 27, 2022

(65) Prior Publication Data
US 2024/0165589 A1 May 23, 2024

(30) Foreign Application Priority Data
Nov. 22, 2022 (KR) .......... 10-2022-0157108

(51) Int. Cl.
*B01J 21/06* (2006.01)
*B01J 23/00* (2006.01)
(Continued)

(52) U.S. Cl.
CPC .......... *B01J 23/002* (2013.01); *B01J 21/063* (2013.01); *B01J 23/44* (2013.01); *B01J 23/755* (2013.01); *B01J 23/83* (2013.01); *B01J 27/20* (2013.01)

(58) Field of Classification Search
CPC ........ B01J 21/063; B01J 23/002; B01J 23/10; B01J 23/755; B01J 23/83; B01J 23/44;
(Continued)

(56) References Cited

U.S. PATENT DOCUMENTS 3,926,854 A * 12/1975 Whelan ............... B01J 23/86
502/328
4,157,987 A * 6/1979 Dolhyj .................. B01J 23/85
562/534
(Continued)

FOREIGN PATENT DOCUMENTS

AU    2007230667 B2 *  2/2011  ............. C01B 3/326
CA       2888784 C  *  6/2019  ............... C10G 3/44
(Continued)

*Primary Examiner* — Cam N. Nguyen

(57) ABSTRACT

Disclosed herein is a catalyst for an upgrading reaction of biomass pyrolysis oil, a method for preparing the same, and a method for upgrading biomass pyrolysis oil using the same. The catalyst is a composite inorganic oxide, and the composite inorganic oxide includes lanthanum, nickel, titanium, and cerium. When a metal catalyst supported on carbon is used as a catalyst for a first step reaction, by using the catalyst as a catalyst for a second step reaction, the efficiency of the upgrading reaction of bio-oil is increased and a continuous reaction is possible without clogging of a continuous reactor.

7 Claims, 1 Drawing Sheet

(51) Int. Cl.
   *B01J 23/10*   (2006.01)
   *B01J 23/44*   (2006.01)
   *B01J 23/755*  (2006.01)
   *B01J 23/83*   (2006.01)
   *B01J 27/20*   (2006.01)
   *C10G 3/00*    (2006.01)

(58) Field of Classification Search
   CPC ... B01J 27/20; C10G 3/47; C10G 3/48; C10G 3/50
   USPC .................. 502/302–304, 335, 337, 350
   See application file for complete search history.

(56) References Cited

U.S. PATENT DOCUMENTS

| | | | | |
|---|---|---|---|---|
| 5,242,881 A * | 9/1993 | Tang | ......................... | B01J 23/10 502/251 |
| 7,977,517 B2 * | 7/2011 | Cortright | ................. | C10G 3/46 568/861 |
| 8,053,615 B2 * | 11/2011 | Cortright | ................. | C10G 3/52 423/437.1 |
| 8,362,307 B2 * | 1/2013 | Cortright | ................. | C10G 3/49 585/242 |
| 8,367,882 B2 * | 2/2013 | Cortright | ................. | C10G 3/47 585/242 |
| 8,455,705 B2 * | 6/2013 | Cortright | ................. | C10G 3/47 585/242 |
| 8,519,203 B2 * | 8/2013 | Marinangeli | ............ | C10G 3/44 585/242 |
| 9,217,114 B2 * | 12/2015 | Cortright | ................. | C10G 3/50 |
| 9,382,185 B2 * | 7/2016 | Held | ....................... | C07C 27/04 |
| 9,428,704 B2 * | 8/2016 | Chheda | .................. | C10G 3/44 |
| 9,593,054 B2 * | 3/2017 | Kania | ...................... | C10G 3/46 |
| 9,656,937 B2 * | 5/2017 | Held | ....................... | C07C 45/59 |
| 10,023,809 B2 * | 7/2018 | Varma | ...................... | C10G 3/47 |
| 10,619,106 B2 * | 4/2020 | Dally | ...................... | C10G 3/48 |
| 11,673,123 B2 * | 6/2023 | Ramirez Reina | ...... | B01J 23/755 423/651 |
| 11,691,882 B2 * | 7/2023 | Kuhn | ..................... | B01J 35/1023 502/328 |
| 2011/0201855 A1 * | 8/2011 | Marinangeli | ............ | C10G 3/47 585/240 |
| 2011/0315931 A1 * | 12/2011 | Aradi | ................... | B01J 31/2295 252/373 |
| 2021/0121854 A1 * | 4/2021 | Zhou | .................... | B01J 23/8986 |
| 2022/0324707 A1 * | 10/2022 | Zhou | .................... | B01J 37/0201 |

FOREIGN PATENT DOCUMENTS

| | | | | |
|---|---|---|---|---|
| EP | 2 141 217 B1 | 3/2015 | | |
| JP | 2009-1722 A | 1/2009 | | |
| KR | 10-1578459 B1 | 12/2015 | | |
| KR | 10-2019-0006385 A | 1/2019 | | |
| KR | 10-2065344 B1 | 1/2020 | | |
| KR | 10-2021-0158492 A | 12/2021 | | |
| WO | WO-2010074923 A2 * | 7/2010 | ............... | C10G 3/46 |
| WO | WO-2012109241 A1 * | 8/2012 | ............... | C10G 3/45 |
| WO | WO-2015171350 A1 * | 11/2015 | ........... | C07C 29/141 |

* cited by examiner

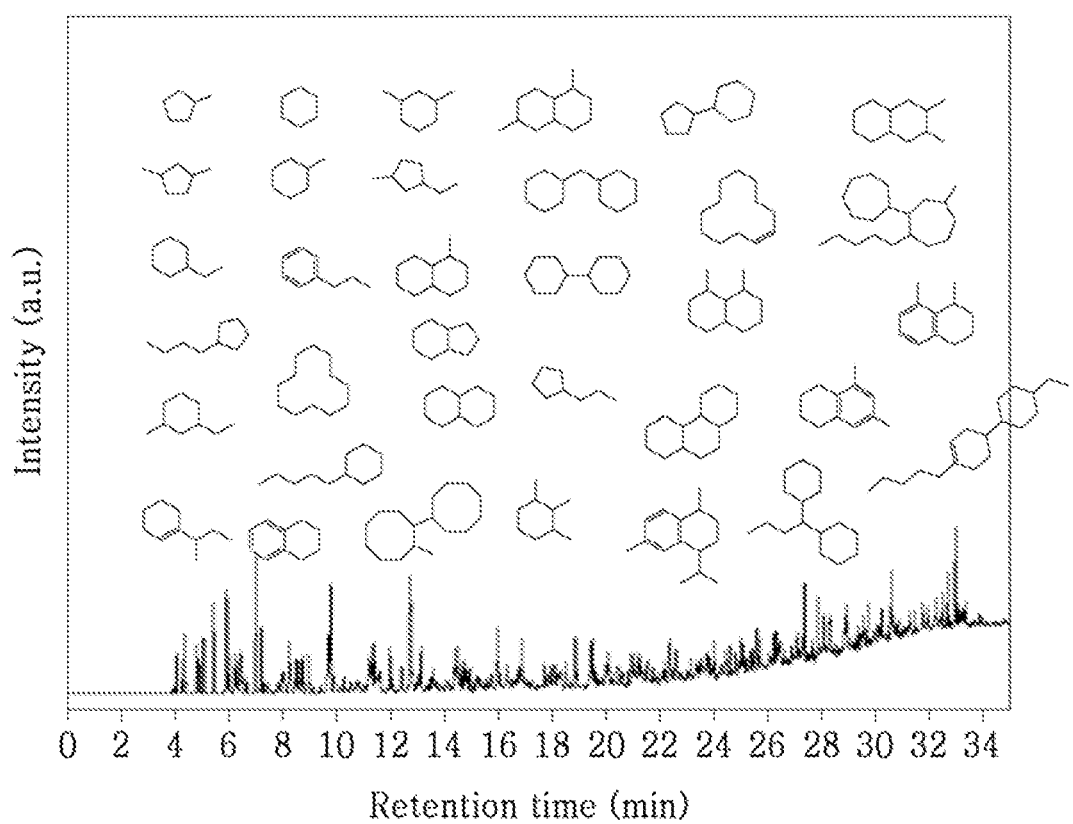

CATALYST FOR AVIATION FUEL PRODUCTION FROM BIO-OIL, METHOD FOR PREPARATION OF THE SAME AND METHOD FOR BIO-OIL UPGRADING USING THE SAME

CROSS REFERENCE TO RELATED APPLICATION

The present application claims priority to Korean Patent Application No. 10-2022-0157108, filed Nov. 22, 2022, the entire contents of which is incorporated herein for all purposes by this reference.

BACKGROUND OF THE INVENTION

Field of the Invention

[Description of Government-Sponsored Research]

This research was conducted by the Korea Institute of Science and Technology under the supervision of the Korea Institute of Science and Technology under the Ministry of Science and ICT. The research project name is Support for research operation expenses (main project expense) for Korea Institute of Science and Technology, and the research task name is the development of next-generation high-efficiency energy material technology (Task identification number: 1711173296).

In addition, this research was conducted by the Korea Institute of Science and Technology under the supervision of the National Research Foundation of Korea under the Ministry of Strategy and Finance. The research project name is the development for a climate change mitigation technology, and the research task name is the development of catalytic chemical process technology for deoxygenation upgrading for aviation biofuel production from wood pyrolysis oil (Task identification number: 1711157611).

Disclosed herein is a catalyst for an upgrading reaction of biomass pyrolysis oil, a method for preparing the same, and a method for upgrading biomass pyrolysis oil using the same.

Description of the Related Art

As part of efforts to reduce carbon emissions in countries around the world, research on technologies for manufacturing typical crude oil-based fuels or petrochemical products using carbon-neutral raw materials is being actively conducted. In particular, in an aviation field, where high energy density is required and the use of conventional internal combustion engines is inevitable, since the use of aviation fuel produced from biomass pyrolysis oil has a significant effect on reducing carbon emission, it is predicted that the demand for aviation biofuel production will increase significantly.

The bio-oil obtained through rapid pyrolysis of biomass contains organic acids with low molecular weight, phenol, guaiacol, and syringol-based monomeric compounds as well as high-molecular compounds produced through new C—C bonds during pyrolysis. In order to manufacture aviation fuel from such bio-oil, it is essential to develop a catalyst that removes oxygen atoms in the product while reducing the carbon chain length by breaking the C—C or C—O bond of the polymer compound.

Due to the characteristics of bio-oil having a wide molecular weight distribution and various functional groups, a process for preparing aviation fuel through two or more catalytic reaction steps such as hydrogenation and hydrodeoxygenation has been reported. However, in general, the production yield of the overall aviation fuel is lowered due to two or more reaction steps, and the disadvantage such as clogging in the reactor during the reaction in the continuous process is considered to be limitations in commercial application.

SUMMARY OF THE INVENTION

In one aspect, an object of the disclosure is to provide a catalyst for an upgrading reaction of biomass pyrolysis oil.

In another aspect, an object of the disclosure is to provide a method for preparing the catalyst.

In still another aspect, an object of disclosure is to provide a method for upgrading biomass pyrolysis oil using the catalyst.

In one aspect, the disclosure provides a catalyst for an upgrading reaction of biomass pyrolysis oil, wherein the catalyst is a composite inorganic oxide, and the composite inorganic oxide comprises lanthanum (La), nickel (Ni), titanium (Ti) and cerium (Ce).

In an exemplary embodiment, the catalyst may be used to produce aviation fuel through the upgrading reaction of the biomass pyrolysis oil.

In an exemplary embodiment, in case of using a metal catalyst supported on carbon as a catalyst for a first-step reaction, the composite inorganic oxide catalyst may be used as a catalyst for a second-step reaction.

In an exemplary embodiment, the metal catalyst supported on the carbon may include palladium (Pd).

In an exemplary embodiment, the catalyst may have a molar ratio of Ce/(Ce+Ti) of 25 to 75.

In an exemplary embodiment, the lanthanum (La), the nickel (Ni), the titanium (Ti), and the cerium (Ce) may be included in an amount of 5 to 30% by mass based on a total weight of the catalyst.

In another aspect, the disclosure provides a method for preparing the catalyst for an upgrading reaction of the biomass pyrolysis oil, including 1) preparing a mixture by mixing metal precursors of lanthanum (La), nickel (Ni), titanium (Ti) and cerium (Ce), ethylene glycol, an aqueous nitric acid solution, and water; and 2) gelling and heat-treating the mixture.

In an exemplary embodiment, in step 2), the mixture may be stirred at 50 to 70° C. until the mixture becomes a gel, then methanol may be added and calcinated at 500 to 800° C.

In still another aspect, the disclosure provides a method for upgrading biomass pyrolysis oil using the catalyst for upgrading reaction of the biomass pyrolysis oil, including the steps of 1) filling a catalyst for a first-step reaction and a catalyst for a second-step reaction in a continuous reactor; and 2) adding biomass pyrolysis oil and hydrogen and heat-treating, wherein the catalyst for the first-step reaction is the metal catalyst supported on carbon, and the catalyst for the second-step reaction is the catalyst for the upgrading reaction of the biomass pyrolysis oil.

In an exemplary embodiment, in step 2), the biomass pyrolysis oil may be introduced at a flow rate of 1 to 10 $g \cdot h^{-1}$.

In an exemplary embodiment, in step 2), the hydrogen, at a pressure of 20 to 100 bar, may be introduced at a weight hourly space velocity (LHSV) of 0.3 to 1.0 $h^{-1}$ in the first reaction step, and at a weight hourly space velocity (LHSV) of 0.1 to 0.5 $h^{-1}$ in the second reaction step.

In an exemplary embodiment, in step 2, the heat treatment, may be performed at 125 to 250° C. in the first reaction step and 200 to 450° C. in the second reaction step.

In one aspect, the technology proposed in this disclosure has the effect of providing a catalyst for the upgrading reaction of biomass pyrolysis oil.

The catalyst for the upgrading reaction of the biomass pyrolysis oil increases the efficiency of the upgrading reaction of the biomass pyrolysis oil and enables a continuous reaction without clogging in a continuous reactor.

In another aspect, the technology proposed in this disclosure has the effect of providing a method for preparing the catalyst.

In still another aspect, the technology proposed in the disclosure has the effect of providing a method for upgrading biomass pyrolysis oil using the catalyst.

BRIEF DESCRIPTION OF THE DRAWINGS

FIGURE shows the main products of the product mixture prepared after an upgrading reaction process of biomass pyrolysis oil according to an embodiment.

DETAILED DESCRIPTION OF THE INVENTION

Hereinafter, the disclosure will be described in detail.

In one aspect, the disclosure provides a catalyst for an upgrading reaction of biomass pyrolysis oil wherein the catalyst is a composite inorganic oxide, and the composite inorganic oxide includes lanthanum (La), nickel (Ni), titanium (Ti), and cerium (Ce).

As used herein, the upgrading reaction of biomass pyrolysis oil refers to a reaction of breaking C—C and C—O bonds of a polymer compound and removing oxygen atoms through hydrocracking and hydrodeoxygenation of biomass pyrolysis oil.

As used herein, the hydrocracking reaction is a reaction in which a high molecular compound is decomposed into a low molecular compound by adding hydrogen, and refers to a reaction in which a liquid product having reduced viscosity is produced using biomass pyrolysis oil as a reactant. The hydrocracking reaction may be to reduce the viscosity of biomass pyrolysis oil.

As used herein, the hydrodeoxygenation reaction refers to a reaction in which an oxygen atom contained in a molecule is removed by adding hydrogen to produce a compound that does not contain oxygen. For example, the hydrodeoxygenation reaction may be to prepare a compound that does not contain oxygen by adding hydrogen to remove oxygen atoms in the form of water or alcohol. In an exemplary embodiment, the hydrodeoxygenation reaction may be accompanied during the hydrocracking reaction.

The biomass pyrolysis oil refers to bio-oil.

As used herein, the pyrolysis oil refers to a liquid product obtained by pyrolysis of biomass, and the pyrolysis oil may be a high-viscosity mixture.

In an exemplary embodiment, the biomass pyrolysis oil may be a material obtained through thermal decomposition by pyrolysis, hydrothermal liquefaction, solvothermal liquefaction, etc. of a biomass raw material at a temperature of 300° C. or higher. Through this thermal decomposition, sugars and sugar-derived low-molecular compounds, aromatic compounds, phenolic compounds, oils and oils-derived compounds, and oligomers or high-molecular compounds in which these low-molecular compounds are polymerized can be obtained.

In one exemplary embodiment, the biomass may be one or more selected from the group consisting of lignocellulose, cellulose, hemicellulose, lignin, lipid, macroalgae, microalgae and carbohydrates.

In an exemplary embodiment, the carbohydrate may be a saccharide compound.

In an exemplary embodiment, the biomass pyrolysis oil may include lignin pyrolysis oil.

In one exemplary embodiment, the catalyst may be to produce aviation fuel through an upgrading reaction of biomass pyrolysis oil.

In an exemplary embodiment, the catalyst may be used in a process of upgrading biomass pyrolysis oil through two or more reaction steps.

In an exemplary embodiment, when a metal catalyst supported on carbon is used as a catalyst for a first-step reaction, the composite inorganic oxide catalyst may be used as a catalyst for a second-step reaction. The first-step reaction is performed with the metal catalyst supported on carbon and the second-step reaction is performed with the composite inorganic oxide catalyst, so that there are effects of increasing the efficiency of the upgrading reaction of bio-oil and enabling continuous reaction without clogging in the continuous reactor. More specifically, there is a technical advantage of increasing the production yield of aviation fuel from bio-oil and continuously producing aviation fuel without clogging in the reactor by effectively suppressing polymerization of reaction raw materials and coke deposition in the catalyst.

In an exemplary embodiment, the metal catalyst supported on the carbon may be one or more selected from the group consisting of molybdenum (Mo), nickel (Ni), cobalt (Co), palladium (Pd), platinum (Pt), ruthenium (Ru), rhodium (Rh), copper (Cu), and iridium (Ir).

In an exemplary embodiment, the metal catalyst supported on the carbon may include palladium (Pd).

In an exemplary embodiment, the catalyst may have a molar ratio of Ce/(Ce+Ti) of 25 to 75.

In another exemplary embodiment, the catalyst may have a molar ratio of Ce/(Ce+Ti) of 25 or more, 30 or more, 35 or more, 40 or more, 45 or more, or 50 or more, and 75 or less, 70 or less, 65 or less, 60 or less, 55 or less, or 50 or less. Preferably, the catalyst may have a molar ratio of Ce/(Ce+Ti) of 45 to 55, 45 to 50, 50 to 55, 46 to 54, 47 to 53, 48 to 52, 49 to 51 or 50.

In an exemplary embodiment, the lanthanum (La), nickel (Ni), titanium (Ti), and cerium (Ce) may be included in an amount of 5 to 30% by mass based on a total weight of the catalyst.

In another exemplary embodiment, the lanthanum (La), nickel (Ni), titanium (Ti), and cerium (Ce) may be included in 5 mass % or more, 10 mass % or more, 15 mass % or more, 20 mass % or more, or 25 mass % or more, and 30 mass % or less, 25 mass % or less, 20 mass % or less, 15 mass % or less, or 10 mass % or less, based on the total weight of the catalyst.

In another aspect, the disclosure provides a method for preparing the catalyst for an upgrading reaction of the biomass pyrolysis oil, including 1) preparing a mixture by mixing metal precursors of lanthanum (La), nickel (Ni), titanium (Ti) and cerium (Ce), ethylene glycol, an aqueous nitric acid solution, and water; and 2) gelling and heat-treating the mixture.

In an exemplary embodiment, step 1) may be to prepare a mixture using 3 to 15 mL of ethylene glycol, 2 to 10 mL of aqueous nitric acid solution, and greater than 0 to 30 mL of water.

In an exemplary embodiment, the aqueous nitric acid solution may have a concentration of 30 to 40 v/v %, 35 to 40 v/v % or 37 v/v %.

In an exemplary embodiment, in step 2), the mixture may be stirred at 50 to 70° C. until the mixture becomes a gel, then methanol may be added and calcinated at 500 to 800° C.

In an exemplary embodiment, the methanol may be added in an amount greater than 0 to 20 mL.

In another aspect, the disclosure provides a method for upgrading biomass pyrolysis oil using the catalyst for upgrading reaction of the biomass pyrolysis oil, including the steps of 1) filling a catalyst for a first-step reaction and a catalyst for a second-step reaction in a continuous reactor; and 2) adding biomass pyrolysis oil and hydrogen and heat-treating, wherein the catalyst for the first-step reaction is the metal catalyst supported on carbon, and the catalyst for the second-step reaction is the catalyst for the upgrading reaction of the biomass pyrolysis oil.

In an exemplary embodiment, in step 2), the biomass pyrolysis oil may be introduced at a flow rate of 1 to 10 g·h$^{-1}$.

In an exemplary embodiment, in step 2), the hydrogen, at a pressure of 20 to 100 bar, may be introduced at a weight hourly space velocity (LHSV) of 0.3 to 1.0 h$^{-1}$ in the first reaction step, and at a weight hourly space velocity (LHSV) of 0.1 to 0.5 h$^{-1}$ in the second reaction step.

In an exemplary embodiment, in step 2, the heat treatment, may be performed at 125 to 250° C. in the first reaction step and 200 to 450° C. in the second reaction step.

Hereinafter, the disclosure will be described in more detail through examples. The following examples are for illustration of the disclosure only, and it will be obvious to those having ordinary knowledge in the art that the scope of the disclosure should not be interpreted as being limited by the examples.

Example 1. Catalyst Preparation (1) Composite Inorganic Oxide Catalyst

Titanium isopropoxide ((Ti[OCH$_3$]$_2$)$_4$), lanthanum nitrate hexahydrate (La(NO$_3$)$_3$·6H$_2$O), cerium nitrate hexahydrate (Ce(NO$_3$)$_3$·6H$_2$O), and nickel nitrate hexahydrate (Ni(NO$_3$)$_2$·6H$_2$O) were dissolved in a mixture of aqueous nitric acid solution (HNO$_3$) and water, stirred at room temperature, and 6.93 mL of ethylene glycol was added to the mixture. After the mixture was stirred at 60° C. until it formed a gel, 10 mL of methanol was added and calcinated at 600° ° C. for 6 hours. The capacity of each metal precursor and aqueous nitric acid solution used is shown in Table 1 below, and the prepared catalyst was represented by Lx (x=0, 25, 50, 75, 100) according to the molar ratio of Ce/(Ce+Ti).

TABLE 1

| Compound | Unit | L0 | L25 | L50 | L75 | L100 |
|---|---|---|---|---|---|---|
| Nickel nitrate hexahydrate | g | 4.65 | 4.65 | 4.65 | 4.65 | 4.65 |
| Lanthanum nitrate hexahydrate | g | 13.56 | 13.56 | 13.56 | 13.56 | 13.56 |
| Cerium nitrate hexahydrate | g | 0.00 | 1.72 | 3.43 | 5.15 | 6.87 |
| Titanium isopropoxide | mL | 4.73 | 3.55 | 2.37 | 1.18 | 0.00 |
| Ethylene glycol | mL | 6.93 | 6.93 | 6.93 | 6.93 | 6.93 |
| Water | mL | 30 | 30 | 30 | 30 | 30 |
| Methanol | mL | 10 | 10 | 10 | 10 | 10 |
| Aqueous nitric acid solution (37%) | mL | 4.4 | 3.5 | 2.5 | 1.5 | 0 |

(2) Pd/C Catalyst

The Pd/C catalyst was obtained from Sigma Aldrich and used as a catalyst in which 5% by mass of palladium was supported on activated carbon.

(3) Carbon Catalyst (Activated Charcoal) A carbon catalyst was obtained from Sigma Aldrich and used.

(4) Ru/WZr Catalyst

The WZr carrier was obtained from Mel Chemicals, and was used after calcining the WZr carrier at 800° C. before supporting Ru elements on the WZr carrier. A mixture of 5 g of the calcined WZr carrier, 0.387 g of ruthenium chloride hydrate (RuCl$_3$·xH$_2$O), and 100 mL of water was stirred at room temperature for 3 hours and dried at 70° C. using a rotary evaporator. The dried powder was heat-treated at 400° C. under hydrogen conditions to prepare a Ru/WZr catalyst supported with 3% by mass of ruthenium.

Example 2. Upgrading Process of Biomass Pyrolysis Oil

Using the catalyst prepared in Example 1, an upgrading process of biomass pyrolysis oil was performed in a continuous reactor. Aviation oil was prepared from biomass pyrolysis oil through the above process. A single catalyst or two catalysts were loaded as catalysts, and the reaction temperature was 150° C. for the Pd/C catalyst and 400° C. for the Ru/WZr, Lx catalysts. Pyrolysis oil was introduced at 5 g·h$^{-1}$ and hydrogen was introduced at a rate of WHSV=0.625 h$^{-1}$ (Pd/C) and WHSV=0.5 h$^{-1}$ (Ru/WZr, Lx) at 100 bar pressure. The liquid mixture obtained after the reaction was analyzed using gas chromatography-mass spectrometry (GC/MS). The liquid phase yield was calculated using the following formula. Table 2 below shows the reaction results according to the catalyst.

Liquid phase yield=(mass of liquid mixture produced/mass of pyrolysis oil added)×100

TABLE 2

| Catalyst | | Hydrogen | Time on stream (h) | | | | | | | | | |
|---|---|---|---|---|---|---|---|---|---|---|---|---|
| 1$^{st}$ step (8 g) | 2$^{nd}$ step (10 g) | pressure (bar) | 6 | 8 | 10 | 12 | 14 | 16 | ... | 30 | 36 | 42 |
| | | | Liquid phase yield(%) | | | | | | | | | |
| Pd/C | | 100 | 48.7 | 68.0 | 67.0 | 68.4 | | 70.1 | | Clogged | | |
| L100 | | 100 | 67.0 | Clogged | | | | | | | | |
| L75 | | 100 | 64.7 | 69.6 | 82.4 | Clogged | | | | | | |
| L50 | | 100 | 72.8 | 67.1 | 65.8 | Clogged | | | | | | |
| L25 | | 100 | 72.4 | 73.1 | Clogged | | | | | | | |
| L0 | | 100 | 74.4 | Clogged | | | | | | | | |

TABLE 2-continued

| Catalyst | | Hydrogen | Time on stream (h) | | | | | | | | | |
|---|---|---|---|---|---|---|---|---|---|---|---|---|
| 1st step (8 g) | 2nd step (10 g) | pressure (bar) | 6 | 8 | 10 | 12 | 14 | 16 | ... | 30 | 36 | 42 |
| | | | | | | Liquid phase yield(%) | | | | | | |
| Carbon Pd/C | L50 | 100 | Clogged | | | | | | | | | |
| Pd/C | Ru/WZr | 100 | 40.0 | 58.0 | 68.7 | 68.9 | 67.1 | Clogged | | | | |
| Pd/C | L50 | 100 | 56.6 | 61.1 | 61.1 | 84.6 | 85.8 | 83.5 | ... | 89.8 | 87.3 | 89.8 |

As a result of the continuous reaction using the catalyst prepared in Example 1, when the Pd/C catalyst was used as a single catalyst, the reactor was clogged after 14 hours, and in the case of the lanthanum-based catalyst, the L100 catalyst and the L0 catalyst showed the clogging of the reactor after 6 hours, the L25 catalyst showed the clogging of the reactor after 8 hours, and the L50 and L75 catalysts showed the clogging of the reactor after 10 hours of continuous operation. As a result of carrying out a continuous reaction by filling two different catalysts in two steps, in the case of the reaction using the Pd/C catalyst and the Ru/WZr catalyst, the reactor clogging occurred after 14 hours, but in the case of the reaction using the Pd/C catalyst and the lanthanum-based catalyst, for example, an L50 catalyst, continuous operation for more than 42 hours was possible without clogging of the reactor. On the other hand, in the case of the reaction using the carbon catalyst and the L50 catalyst, it was confirmed that the reactor was clogged after 4 hours. Commonly known causes of reactor clogging were known as polymerization of raw materials and carbon deposition in catalyst pores, but it was confirmed that it effectively suppressed such phenomena when Pd/C and lanthanum-based catalysts were used as multi-step reaction catalysts.

Table 3 below shows the results of comparing the physical properties of the pyrolysis oil used as a reactant, that is, bio-oil, and the oil product prepared using the Pd/C catalyst and the L50 catalyst prepared in Example 1. In the case of bio-oil, oxygen accounts for 47.5% of the total weight, whereas in the case of oil produced using a two-step catalyst of Pd/C and L50, the mole ratios of O/C and H/C were 0.02 and 2.13, respectively, indicating that the hydrodeoxygenation reaction was effective. In addition, as a result of confirming the chemical structure of the oil product through GC/MS analysis for the oil produced using the two-step catalysts of Pd/C and L50, it was found that various structures of hexagonal or pentagonal saturated hydrocarbon-based compounds (C6-C20) were generated (see FIGURE). The calorific value of the oil product was calculated to be 51.28 kJ/g, and the carbon recovery rate was 60.4% compared to the reactant bio-oil.

TABLE 3

| Sample | Element analysis(wt. %) | | | Moisture content (wt. %) | O/C | H/C | HHV (kJ/g) | Carbon recovery rate(%) |
|---|---|---|---|---|---|---|---|---|
| | C | H | O | | | | | |
| Bio-oil | 45.6 | 7.5 | 47.5 | 28.00 | 0.37 | 1.16 | 17.64 | — |
| Product mixture | 87.2 | 15.5 | 2.6 | 0.69 | 0.02 | 2.13 | 51.28 | 60.40 |

The disclosure has been described in detail. It will be apparent to those skilled in the art that the description proposed herein is just a preferable example for the purpose of illustrations only, not intended to limit the scope of the disclosure, so it should be understood that other equivalents and modifications could be made thereto without departing from the scope of the disclosure.

What is claimed is:

1. A method for upgrading biomass pyrolysis oil, comprising the steps of 1) loading a catalyst for a first-step reaction and a catalyst for a second-step reaction in a continuous reactor; and 2) adding biomass pyrolysis oil and hydrogen and heat-treating, wherein the catalyst for the first-step reaction is a metal catalyst supported on carbon, the catalyst for the second-step reaction is a composite inorganic oxide, and the composite inorganic oxide comprises lanthanum (La), nickel (Ni), titanium (Ti) and cerium (Ce).

2. The method of claim 1, wherein the method produces aviation fuel from the biomass pyrolysis oil.

3. The method of claim 1, wherein the heat treatment is performed at 125 to 250° C. in the first-step reaction and 200 to 450° C. in the second-step reaction.

4. The method of claim 1, wherein the metal catalyst supported on the carbon comprises palladium (Pd).

5. The method of claim 1, wherein the catalyst for the second-step reaction has a molar ratio of Ce/(Ce+Ti) of 25 to 75.

6. The method of claim 1, wherein the lanthanum (La), the nickel (Ni), the titanium (Ti), and the cerium (Ce) are included in an amount of 5 to 30% by mass based on a total weight of the catalyst for the second-step reaction.

7. The method of claim 6, wherein the lanthanum (La), the nickel (Ni), the titanium (Ti), and the cerium (Ce) are included in an amount of 25 to 30% by mass based on the total weight of the catalyst for the second-step reaction.

\* \* \* \* \*